J. W. De VILBISS, Jr.
Animal-Traps.
No. 148,427. Patented March 10, 1874.
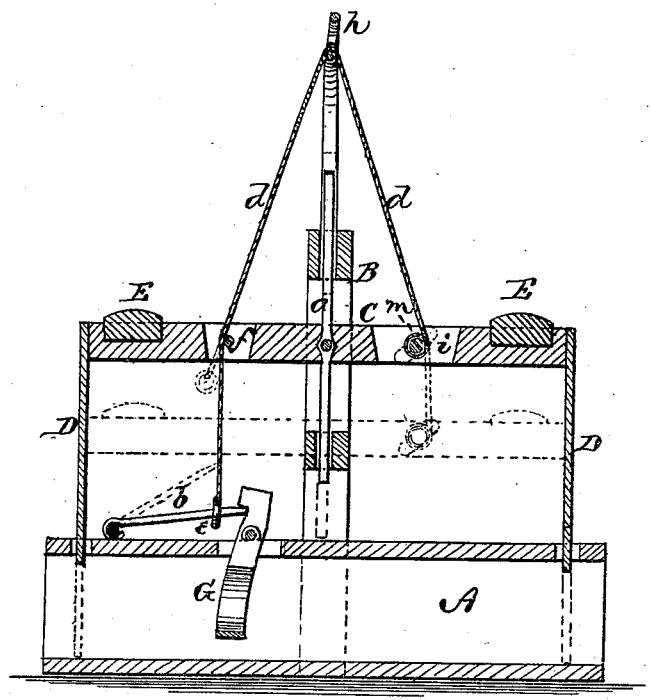

UNITED STATES PATENT OFFICE.

JOHN W. DE VILBISS, JR., OF SAN ANTONIO, TEXAS.

IMPROVEMENT IN ANIMAL-TRAPS.

Specification forming part of Letters Patent No. 148,427, dated March 10, 1874; application filed January 12, 1874.

*To all whom it may concern:*

Be it known that I, JOHN W. DE VILBISS, Jr., of San Antonio, in the county of Bexar and State of Texas, have invented certain new and useful Improvements in Animal-Trap; and I do hereby declare that the following is a full, clear, and exact description thereof, reference being had to the accompanying drawings and to the letters of reference marked thereon, which form a part of this specification.

The nature of my invention consists in the construction and arrangement of an animal-trap, as will be hereinafter more fully set forth.

In order to enable others skilled in the art to which my invention appertains to make and use the same, I will now proceed to describe its construction and operation, referring to the annexed drawing, which represents a longitudinal section of my trap.

A represents a box made in rectangular form, of any suitable dimensions, and open at both ends. B is a frame erected vertically in the center of the box A and rising above the same to a suitable height. In this frame is a beam, C, placed parallel with and above the box A, and movable up and down in the frame. The beam is, in the center, provided with a vertical rod, $a$, passing through the cross-bars in the frame, above and below the beam C. This rod guides the beam vertically in its movement, and prevents it from being moved endwise. At each end of the beam C is rigidly attached a gate, D, which passes through a slot in the top of the box, and these gates, when the beam is down, close the ends of the box A. The beam C is, at or near each end, provided with a weight, E, embedded in the beam, to cause it to fall suddenly of its own weight. G represents the trigger, pivoted in a slot in the top of the box A, on one side of the frame B. The lower end of this trigger is made in ring form, so as to take up more room in the box A, and yet not obstruct the light through the box. $b$ is a rod or bar hinged or pivoted on top of the box A, and the free end of which is caught by the trigger G when the trap is set. $d$ is a cord or rope provided with a ring, $e$, at one end. This ring is placed on the rod $b$, and the end of the rod in the trigger. The cord is then passed through a slot, $f$, in the beam C, and through a guide, $h$, arranged on the top of the frame B, and then down on the other side, and attached to a pin, $m$, in a slot, $i$, near the other end of the beam. By lengthening and shortening the cord $d$, by turning the pin $m$, the height at which the beam C is to be elevated, and consequently the distance at which the gates are raised, is easily regulated.

The trap being set, as above described, and as shown in the drawing, the animal enters the box A at one end, and is attracted by the light from the other end. As soon as the animal touches the trigger G the rod $b$ is released, allowing the ring $e$ to slip off, and the beam C, with the gates, drops suddenly, shutting the animal in the box.

Though this trap may be used for catching various animals, I have especially designed it for catching the gopher or salamander. For catching this animal a place is dug in the ground, so that the end of the box farthest from the trigger may be set close to the hole of the animal. In coming out, the animal enters this end of the box and goes toward the light at the other end, and is caught as above mentioned, thus catching the animal without bait, simply by the light.

Having thus fully described my invention, what I claim as new, and desire to secure by Letters Patent, is—

1. The combination of the beam C, cord $d$, ring $e$, rod $b$, and trigger G, constructed and arranged substantially as and for the purposes herein set forth.

2. The regulating-pin $m$, in combination with the beam C and cord $d$, for the purposes herein set forth.

3. The open-ended box A, frame B, weighted beam C, gates D, trigger G, rod $b$, ring $e$, and cord $d$, all constructed and combined, substantially as and for the purposes herein set forth.

In testimony that I claim the foregoing as my own I affix my signature in the presence of two witnesses.

JOHN W. DE VILBISS, JR.

Witnesses:
 H. MACCORMACK,
 WM. W. GAMBLE.